US012526082B2

(12) United States Patent
Fu et al.

(10) Patent No.: US 12,526,082 B2
(45) Date of Patent: Jan. 13, 2026

(54) COMMUNICATION METHOD AND DEVICE

(71) Applicant: GUANGDONG OPPO MOBILE TELECOMMUNICATIONS CORP., LTD., Guangdong (CN)

(72) Inventors: Zhe Fu, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 362 days.

(21) Appl. No.: 18/305,035

(22) Filed: Apr. 21, 2023

(65) Prior Publication Data

US 2023/0261801 A1 Aug. 17, 2023

Related U.S. Application Data

(63) Continuation of application No. PCT/CN2020/134234, filed on Dec. 7, 2020.

(51) Int. Cl.
*H04L 1/1812* (2023.01)
*H04L 1/1829* (2023.01)
*H04W 28/02* (2009.01)
*H04W 28/04* (2009.01)

(52) U.S. Cl.
CPC .......... *H04L 1/1819* (2013.01); *H04L 1/1848* (2013.01); *H04W 28/0268* (2013.01); *H04W 28/04* (2013.01)

(58) Field of Classification Search
CPC ... H04L 1/1819; H04L 1/1848; H04L 1/1887; H04L 1/00; H04W 28/0268; H04W 28/04
See application file for complete search history.

(56) References Cited

U.S. PATENT DOCUMENTS

| 2020/0274654 | A1 | 8/2020 | Loehr et al. | |
| 2021/0235399 | A1* | 7/2021 | Wich | H04W 28/0268 |
| 2021/0337404 | A1* | 10/2021 | Sun | H04W 72/23 |
| 2023/0104242 | A1* | 4/2023 | Fu | H04W 76/18 |
| | | | | 370/225 |
| 2023/0292173 | A1* | 9/2023 | Zou | H04W 28/06 |
| 2024/0098842 | A1* | 3/2024 | Tan | H04W 4/50 |
| 2024/0349386 | A1* | 10/2024 | Kela | H04W 76/27 |
| 2024/0380523 | A1* | 11/2024 | Yu | H04L 1/1864 |

FOREIGN PATENT DOCUMENTS

| CN | 111327392 | 6/2020 |
| CN | 111327404 | 6/2020 |
| CN | 111432440 | 7/2020 |
| EP | 3896876 | 10/2021 |

(Continued)

OTHER PUBLICATIONS

Huawei et al., "Discussion on RAN enhancements based on new QoS related parameters," 3GPP TSG-RAN WG2 Meeting #112-e, R2-2008854, Nov. 2020.

(Continued)

*Primary Examiner* — Abdullahi Ahmed
(74) *Attorney, Agent, or Firm* — Hodgson Russ LLP

(57) ABSTRACT

Provided are a communication method and a communication devices. A communication method includes: determining according to first information, by a communication device, whether to initiate a survival time guarantee strategy.

17 Claims, 9 Drawing Sheets

(56) References Cited

FOREIGN PATENT DOCUMENTS

| EP | 3902324    | 10/2021 |
|----|------------|---------|
| WO | 2020119195 | 6/2020  |
| WO | 2020143298 | 7/2020  |
| WO | 2020221436 | 11/2020 |

OTHER PUBLICATIONS

EPO, Extended European Search Report for EP Application No. 20964463.2, Jul. 3, 2023.
Lenovo et al., "Discuss on the mechanism to guarantee the survival time," 3GPP TSG-RAN WG2 Meeting #112 electronic, R2-2009870, Nov. 2020.
CNIPA, Second Office Action for CN Application No. 202080103771.7, Dec. 6, 2024.
CNIPA, First Office Action for CN Application No. 202080103771.7, Aug. 19, 2024.
"3rd Generation Partnership Project; Technical Specification Group Services and System Aspects; Service requirements for cyber-physical control applications in vertical domains; Stage 1 (Release 17)," 3GPP TS 22.104, Sep. 2020, v17.4.0.
Zte Corporation et al., "New QoS related parameters in TSN," 3GPP TSG-RAN WG2 Meeting #112 E-meeting, R2-2009062, Nov. 2020.
WIPO, International Search Report and Written Opinion for International Application No. PCT/CN2020/134234, Sep. 9, 2021.

\* cited by examiner

COMMUNICATION METHOD AND DEVICE

CROSS-REFERENCE TO RELATED APPLICATION(S)

This application is a continuation of International Application No. PCT/CN2020/134234, filed Dec. 7, 2020, the entire disclosure of which is incorporated herein by reference.

TECHNICAL FIELD

This disclosure relates to the field of communication, and particularly relates to a communication methods and communication device.

BACKGROUND

In order to meet the requirements for rate, time delay, high-speed mobility, energy efficiency and the like and to cope with the diversity and complexity of services in future life, the 3rd generation partnership project (3GPP) international standard organization starts to develop a 5G (fifth generation) mobile communication technology. Main application scenarios of 5G include enhanced mobile broadband (eMBB), ultra-reliable and low latency communication (URLLC), and massive machine type communication (mMTC).

SUMMARY

Disclosed herein are implementations of a communication method, including: determining according to first information, by a communication device, whether to initiate a survival time (ST) guarantee strategy.

Disclosed herein are implementations of a communication device, including a processor and a memory. The memory stores computer programs which, when executed by the processor, are operable with the processor to determine, according to first information, whether to initiate a survival time guarantee strategy.

Disclosed herein are implementations of a non-transitory computer readable storage medium, configured to store computer programs which, when executed by a device, cause the device to perform the above communication method.

BRIEF DESCRIPTION OF THE DRAWINGS

FIG. 3A and FIG. 3B 2exemplarily shows a relation between traffic transmission and survival time.

DETAILED DESCRIPTION

Figure 1:
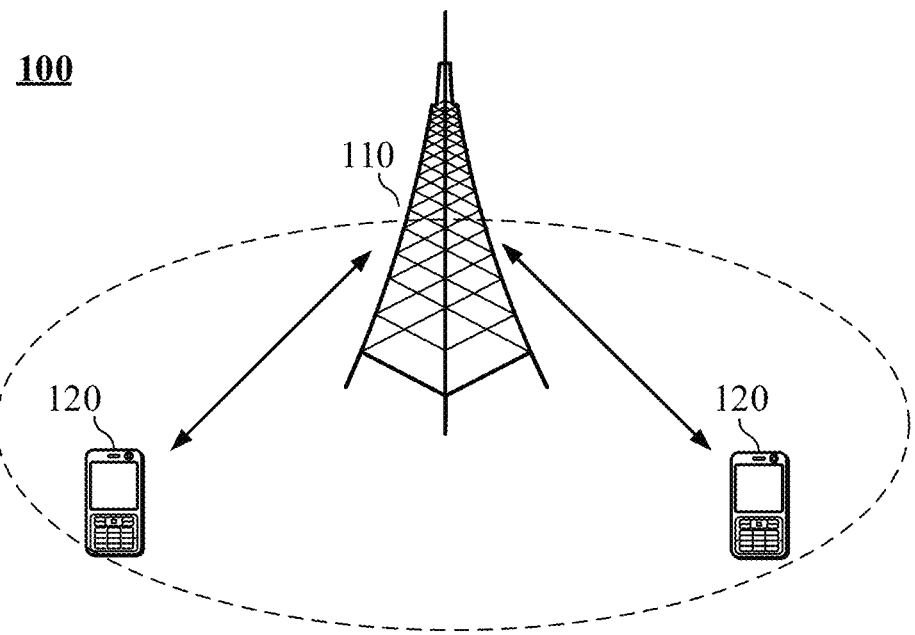
FIG. 1 is a schematic diagram of an application scenario according to an implementation of the disclosure.

The following describes the technical solutions in implementations of the present application with reference to the accompanying drawings in the implementations of the present application.

Implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a 5th generation (5G) system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

Optionally, the communication system in implementations of the disclosure is applicable to an unlicensed spectrum, and an unlicensed spectrum may be regarded as a shared spectrum. Or the communication system in implementations of the disclosure is applicable to a licensed spectrum, and a licensed spectrum may be regarded as a non-shared spectrum.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a hand-held device with wireless communication functions, a computing device, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligent design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (gNB) in an NR network, a network device in a future evolved PLMN, or a network device in an NTN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100. The communication system 100 may include a network device 110 and two terminal devices 120. Optionally, the communication system 100 may include multiple network devices 110, and there may be other number of terminal devices 120 in the communication coverage of each network device 110, implementations of the disclosure are not limited in this regard.

Optionally, the communication system 100 may further include other network entities such as a mobility management entity (MME), an access and mobility management function (AMF), and implementations of the disclosure are not limited in this regard.

The network device may further include an access network device and a core network device. That is, the wireless communication system further includes multiple core networks for communicating with the access network device. The access network device may be an evolved node B (evolutional node B, which may be an eNB or an e-Node B for short), macro base station, a micro base station (also referred to as a "small base station"), a pico base station, an access point (AP), a transmission point (TP), or a new generation node B (gNodeB) in a long-term evolution (LTE) system, a next generation new radio (NR) system or an authorized auxiliary access long-term evolution (LAA-LTE) system, or the like.

It should be understood that, in implementations of the disclosure, a device with communication functions in a network/system can be referred to as a "communication device". Taking the communication system 100 illustrated in FIG. 1 as an example, the communication device may include the network device and the terminal device that have communication functions. The network device and the terminal device can be the devices described above and will not be elaborated again herein. The communication device may further include other devices such as a network controller, a mobile management entity, or other network entities in the communication system, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

In order to facilitate understanding of the technical solutions of the implementations of the disclosure, the following describes the related technical solutions of the implementations of the present application. The following related technical solutions may be arbitrarily combined with the technical solutions of the implementations of the present application as an optional solution, and all belong to the scope of protection of the embodiments of the present application.

An R17 URLLC project in 3GPP requires a radio access network (RAN) to perform enhancement based on a survival time, so as to reduce an error rate of packet transmission, thereby improving an accuracy rate of packet transmission and better guaranteeing and improving service efficiency and quality of a communication network.

The survival time is used to describe tolerance for transmission failures, and the survival time is characterized as follows.

The survival time can be sent to the base station together with time sensitive communication assistance information (TSCAI).

The survival time can be specified by an application function (AF), and can be related to a burst periodicity or to a maximum allowable (or tolerance) number of consecutive transmission failures (e. g., message transmission failures).

"The survival time can be sent to the base station together with TSCAI" may be that information relating to the survival time and information relating to TSCAI are sent to the base station together, or the information relating to the survival time is carried in the information relating to TSCAI and is sent to the base station as part of the information relating to TSCAI, which is not limited herein.

The "message" may include a single burst, or may include one or more packets. For example, when a packet delay budget requirement corresponding to the message is not satisfied, it can be considered that the communication traffic transmission fails.

The survival time may be related to a traffic cycle (or burst periodicity). For example, the survival time may be represented by a traffic cycle. For example, the survival time may be a period of time, and may be related to the cycle. For example, the survival time is 4.3 traffic cycles or 3 traffic cycles. It can be seen therefrom that the survival time may be a multiple of the traffic cycles, for example, may be an integral multiple, and may also be a non-integral multiple, which is not limited herein. For example, the survival time may be any of M cycles and N cycles, where N is greater than M and both M and N are greater than 0. Here, N and M may or may not be integers, and since they may be any values, the survival time greater than M periods and less than N periods is not necessarily an integer number of periods either.

The "survival time" may correspond to a burst (or a message) and therefore can be represented by a burst periodicity, for example, may be represented by a burst transmission period.

In addition, a burst may correspond to a message. A burst or a message may include one or more packets, so the survival time may also be represented by a packet cycle, for example, may be represented by a packet transmission period.

That is to say, the survival time may be represented by a burst periodicity and may also be represented by a packet cycle. In addition, the survival time may also be represented by other means, which is not limited herein.

As described above, the service cycle may be a burst transmission period, a packet transmission period, or other periods. Accordingly, the survival time may be related to the burst transmission period or the packet transmission period, for example, may be an integer multiple or a non-integer multiple of the burst transmission period, or may also be an integer multiple or a non-integer multiple of the packet transmission period.

Since the survival time can be represented by a burst period or a packet period, the detection of the survival time (for example, detecting or determining whether the survival time expires) can also be realized through detection of the burst periodicity or the packet cycle. Therefore, in the following, the survival time and related content can be represented by a burst or a packet. As stated above, the present disclosure is not limited thereto, and may also be characterized in other manners, which will not be elaborated herein.

For example, if the traffic cycle is a burst transmission period, in a case that the survival time is greater than or equal to the duration of X (X may be an integer or a non-integer) traffic cycles, if consecutive X−1 or X burst transmission fails (where, in a case that X is a non-integer, X−1 and X may be integer values after rounding), the next 1 burst must be correctly transmitted. Otherwise, the communication traffic transmission fails.

For another example, if the traffic cycle is a packet transmission period, in a case in which the survival time is greater than or equal to the duration of L (L may be an integer or a non-integer) traffic cycles, if consecutive L−1 or L packet transmission fails (where, in a case in which L is a non-integer, L−1 and L may be integer values obtained after rounding), the next 1 packet must be correctly transmitted. Otherwise, the communication traffic transmission fails.

Some exemplary scenarios of survival time have been given above, but it should be understood that the present disclosure is not limited thereto.

Implementations of the disclosure provide supporting examples of the survival time, so as to facilitate use of the survival time to provide a high-quality communication service with a low transmission error rate.

Figure 2A:
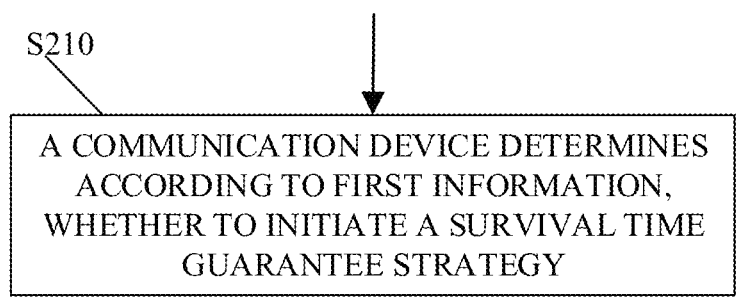
FIG. 2A is a schematic flowchart of a communication method according to an implementation of the disclosure.

FIG. 2A is a schematic flow chart of a communication method according to an implementation of the disclosure. The method may optionally be applied to the communication system illustrated in FIG. 1, but is not limited thereto. The method includes at least some of the following content.

S210, a communication device determines according to first information whether to initiate a survival time guarantee strategy.

In this disclosure, in order to support the survival time and ensure transmission quality, the communication device determines according to the first information whether to initiate a survival time guarantee strategy. On the basis of the first information, it is possible to make clear whether it is necessary and/or possible to initiate the survival time guarantee strategy, thereby also facilitating providing a more targeted or upper quality communication service.

Optionally, in step 210, determining whether to initiate the survival time guarantee strategy includes at least one of the following: determining whether a survival time needs to be satisfied, and determining whether to execute a first behavior.

As can be seen, the survival time guarantee strategy includes satisfying the survival time or executing the first behavior. The "survival time guarantee strategy" may also include other aspects relating to survival time guarantee, which is not limited herein.

Optionally, determining whether the survival time needs to be satisfied includes determining whether it is a timing satisfying the survival time. The timing satisfying the survival time includes at least one of: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

Figure 2B:
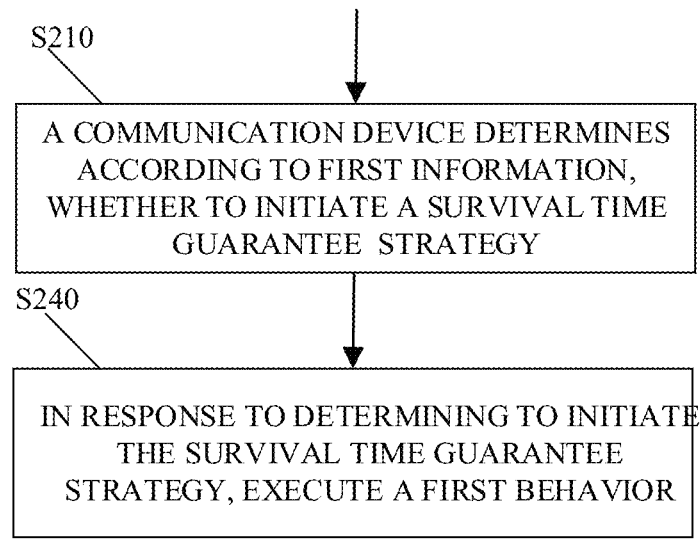
FIG. 2B is a schematic flowchart of a communication method according to another implementation of the disclosure.

Optionally, the communication method according to implementations of the disclosure further include S 240, as illustrated in FIG. 2B.

S240, in response to determining to initiate the survival time guarantee strategy, the first behavior is executed.

Optionally, the first behavior may include a monitoring behavior related to a survival time (for example, a behavior of reporting to a network) and/or a guarantee behavior (for example, a behavior of regulating resources, a behavior of starting or maintaining a timer, and the like). Thus, the quality of the communication service can be ensured and improved through the first behavior.

The monitoring behavior and/or the guarantee behavior related to the survival time may include a monitoring behavior and/or a guarantee behavior for guaranteeing quality of service (QoS), and may also include other monitoring behaviors and/or guarantee behaviors, which is not limited herein.

Optionally, the first behavior may include at least one of the following: sending feedback information related to the survival time or the survival time guarantee strategy to the communication network; adjusting or selecting a resource for prioritized transmission; adjusting a logical channel mapping constraint; adjusting or selecting a logical channel mapping parameter; adjusting or selecting a QoS parameter, where the QoS parameter comprises at least one of a reliable transmission parameter and a transmission priority; adjusting a serving cell; adjusting a transmission bandwidth; and starting or maintaining a timer corresponding to the ST.

A timing when the timer is started includes at least one of: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

In this disclosure, the duration of the timer corresponding to the survival time does not have to be equal to the duration determined by the survival time (or "the duration of the survival time" for short).

Optionally, the duration of the timer corresponding to the survival time may be a value between 0 and the duration of the survival time (including the duration of the survival time), that is, the duration of the timer may be greater than 0 and less than or equal to the duration of the survival time.

Optionally, the duration of the timer corresponding to the survival time may be a value between 0 and a duration of (survival time+Y traffic cycles) (including a duration of (survival time+Y traffic cycles)), that is, the duration of the timer may be greater than 0 and less than or equal to the duration of (survival time+Y traffic cycles). Y may be a value greater than or equal to 0, and Y may be an integer or a non-integer. For example, when Y=1, a duration of a timer of a survival time may be a value between 0 and a duration of (survival time+1 traffic cycle) (including a duration of (survival time+1 traffic cycle)), that is, the duration of the timer may be greater than 0 and less than or equal to the duration of (survival time+1 traffic cycle). When Y=0.5, the duration of the timer of the survival time may be a value between 0 and the duration of (survival time+0.5 traffic cycles) (including the duration of (survival time+0.5 traffic cycles)), that is, the duration of the timer may be greater than 0 and less than or equal to the duration of (survival time+0.5 traffic cycles). When Y=2.1, the duration of the timer of the survival time may be a value between 0 and the duration of (survival time+2.1 traffic cycles) (including the duration of (survival time+2.1 traffic cycles)), that is, the duration of the timer may be greater than 0 and less than or equal to the duration of (survival time+2.1 traffic cycles). Here, the value of Y is not particularly limited, as long as the timer corresponding to the survival time can make the traffic transmission meet the requirement of the corresponding survival time requirement.

Some examples of the duration of the timer are given above, but these examples should not be construed as limitations to the present disclosure, as long as the duration of the timer is set to ensure that the traffic transmission satisfies the requirement for the survival time.

For example, if the duration of the survival time is three traffic cycles, if the timer is started every time traffic is transmitted, the duration of the timer is three traffic cycles, i.e., equal to the duration of the survival time. The timer can be restarted on every successful transmission. If the timer is started on first traffic transmission failure, the duration of the timer may be 2 traffic cycles. If the timer is started when consecutive two traffic transmission failures occurs (two traffic cycles elapsed), the duration of the timer may be one traffic cycle. In this implementation, when it is determined that the next traffic needs to be transmitted successfully, which means there are consecutive two traffic transmission failures, the duration of the timer in this case may be 1 traffic cycle.

In conclusion, in the present disclosure, the purpose of the timer corresponding to the survival time is to determine whether the survival time can be satisfied, therefore, any timer which is started for this purpose can be used.

Figure 2C:
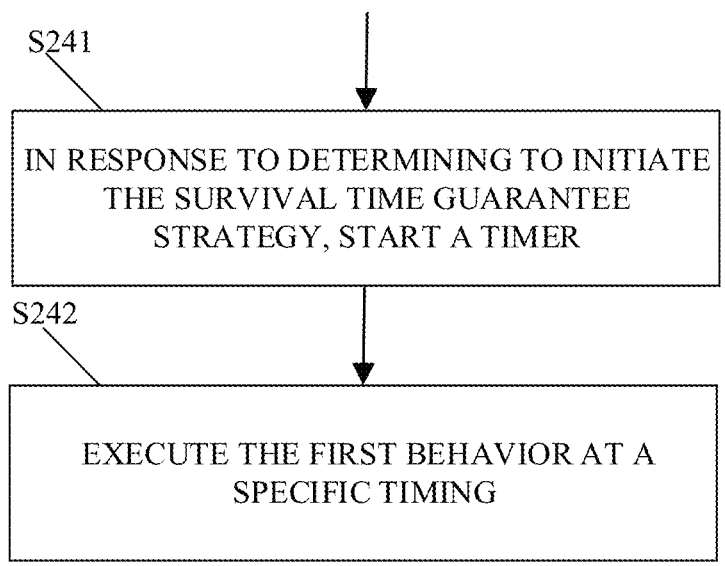
FIG. 2C is a schematic flowchart of a communication method according to another implementation of the disclosure.

Optionally, S240 may include S241 and S242, as illustrated in FIG. 2C.

S241, in response to initiating or enabling the survival time guarantee strategy, a timer corresponding to the survival time is started.

Optionally, the timer may be started by the communication device.

Optionally, an example of the communication method according to implementations of the disclosure may further include: S242, a first behavior is executed at a specific timing (in other words, time point).

Each step in this implementation is described in detail for the convenience of understanding. A person skilled in the art should understand that these steps are not all necessary, and the order of these steps is also exemplary. Therefore, the order of the steps can be adjusted according to situations.

In the present disclosure, after determining to initiate the survival time guarantee strategy, the timer corresponding to the survival time may be started, so as to facilitate monitoring of communication quality, and the first behavior is executed at a timing related to the timer (namely, the specific timing, serving as a condition related to the timer and used for triggering execution of the first behavior). However, the first behavior may also be executed regardless of whether the timer is started or not.

Optionally, the first behavior may be executed when at least one of (that is, the specific timing): when the timer is started; after the timer is started; during running of the timer; at a specific time before the timer expires; at a specific time after the timer times out or stopped; and at a specific time after the timer expires.

The foregoing "specific time" may include a current time, for example, "a specific time after the timer times out of stopped" may include the time when the timer times out or stopped, and some time after the timer times out or stopped. The "specific time before the timer expires" may include a specific time when the timer expires and a specific time before the timer expires. The "specific time after the timer expires" may include a specific time when the timer expires and a specific time after the timer expires.

Alternatively, for various possible first behaviors, the behavior of "sending feedback information related to the survival time or the survival time guarantee strategy to the communication network" may be executed by the communications device; behaviors with regard to "adjusting or selecting a resource for prioritized transmission", "adjusting a logical channel mapping constraint", "adjusting or selecting a logical channel mapping parameter", "adjusting or selecting a QoS parameter", "adjusting a serving cell", "adjusting a transmission bandwidth", etc. may be executed by a network device or executed by the communication device under the control of the network device. The behavior of "starting or maintaining the timer corresponding to the survival time" may also be executed by the network device or by the communication device under the control of the network device. However, the present disclosure is not limited thereto.

Figure 3A:
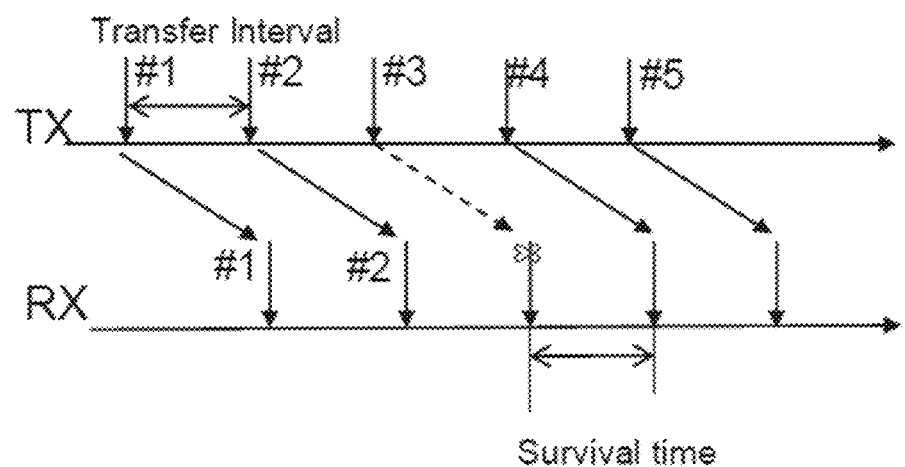

As illustrated in FIG. 3, where TX represents transmitting, RX represents receiving, in FIG. 3A, transmission failure occurs to third traffic (for example, packet or burst). In FIG. 3A, the survival time is one transmission interval (traffic cycle). In this case, whether the survival time is satisfied can be determined every time a traffic is transmitted, when it is determined there is first packet or burst transmission failure, or when next traffic needs to be transmitted successfully. Here, it is necessary to ensure successful transmission of the next traffic.

Figure 3B:
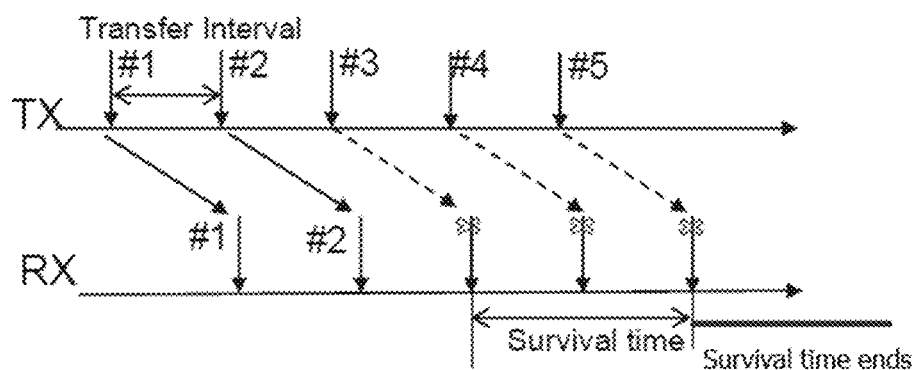

In FIG. 3B, the survival time is two transmission intervals (traffic cycles), and the maximum allowable number of transmission failures is 2. The timing satisfying the survival time may be at least one of the following or a combination thereof: every time a traffic is transmitted (that is, the first (#1) transmission, the second (#2) transmission, the third (#3) transmission, the fourth (#4) transmission, and the fifth (#5) transmission, etc.); when it is determined that a transmission failure occurs for the first time (for example, first transmission failure occurs to the third (#3) transmission); when the number of consecutive transmission failures is 2 (which is greater than 1 and is less than or equal to the maximum allowable number of consecutive transmission failures, for example, when the number of transmission failures is greater than 1 and equal to the maximum allowable number of consecutive transmission failures minus 1); when it is determined that next traffic needs to be transmitted successfully (for example, when the third transmission fails, it means that the next transmission, that is, the fourth (#4) transmission needs to be successful; if the third transmission and the fourth transmission both fail, it means that two consecutive transmission failure occurs, and the fifth (#5) transmission needs to be successful).

For example, if the timing satisfying the survival time is every time a packet or burst is transmitted, whether current time is the timing satisfying the survival time will be determined every time a packet (in the case that "packet" is to be used in the traffic cycle of the survival time) or burst is transmitted (in the case that "burst" is to be used in the traffic cycle of the survival time). That is to say, after transmission in each traffic cycle (packet or burst), whether current time is the timing satisfying the survival time will be determined.

Other timings that satisfying the survival time are similar to that described above and will not be repeated herein.

It should be noted that, determination of whether it is a timing satisfying the survival time is not limited to one situation, but can be a combination of various situations. That is, whether it is a timing satisfying the survival time can be determined every transmission of a traffic cycle (packet or burst), and can also be determined when the number of consecutive transmission failures is greater than 1 and less than or equal to the maximum allowable number of consecutive transmission failures.

As can be seen, the first behaviors above are measures taken to satisfy survival time and improve transmission quality. It will be appreciated by those skilled in the art that the present application is not limited thereto.

"Sending feedback information related to the survival time or the survival time guarantee strategy to the communication network" aims to report feedback information to the network, in this way, the network can perform regulation and control conveniently, and support in aspects such as resources can be further obtained from the network.

The other first behaviors listed above may be the regulation and control behaviors executed under the control of the network side, and/or regulation and control behaviors of the communication device based on an instruction from the network, so as to guarantee and improve the transmission quality. In addition, other behaviors may also be included, for example, starting or maintaining a corresponding timer, and so on.

Optionally, determining whether to initiate the survival time guarantee strategy in S210 includes determining whether a first object initiates the survival time guarantee strategy.

That is, in this disclosure, the survival time guarantee strategy can be initiated at the first object. The first object includes an application-level transfer object.

In this disclosure, optionally, the application-level transfer object includes at least one of: a user equipment (UE); a user data radio bearer (DRB); a QoS flow; a time-sensitive networking (TSN) flow; and a packet data unit (PDU) session.

Optionally, the first object may have not been configured with a survival time, or may be configured with or indicated with a survival time, or may be configured with or indicated with a survival time guarantee strategy. In any case, the operation of determining whether to initiate the survival time guarantee strategy can be initiated for an appropriate first object.

Some examples of the first object are given above for ease of understanding, however, those skilled in the art will appreciate that application-level transfer objects are not limited to those given above. Moreover, the objects capable of initiating the survival time guarantee strategy are not limited to these objects either.

Optionally, according to implementations, the first information may contain first parameter.

The first parameter may include at least one of: a survival time (ST); a DRB identifier (ID); a QoS flow ID; a TSN flow ID; a PDU session ID; a time of arrival of traffic; a traffic cycle; and a traffic mode.

That is to say, the first parameter may include any one of the above, or may include any possible combinations thereof.

Regarding the traffic mode, it can be a periodic traffic mode or an aperiodic traffic mode. For the periodic traffic mode, the first parameter may further include a time of arrival of the traffic and/or a traffic cycle. For the aperiodic traffic mode, the first parameter may include time of arrival of the traffic, a traffic mode parameter, and so on.

By containing in the first information the first parameter which includes at least one of the above, the communications device can determine whether to initiate the survival time guarantee strategy based on the first parameter. If the determination is to be made for the first object, identifier information of the first object can be contained in the first parameter.

Optionally, the first information may further contain first indication, and the first indication is used to configure or indicate initiating of the survival time guarantee strategy.

In this disclosure, the first indication and the first parameter can both be contained in the first message, or can be contained in the first message separately. Or, the first indication can be contained in the first parameter or the first parameter can be contained in the first indication, as long as the required functions can be implemented and there is no conflict between each other.

Optionally, the first information can be received by the communication device from the outside or from the communication device per se, the disclosure is not limited thereto.

Similarly, the survival time can be received by the communication device from the outside or from the communication device per se, the disclosure is not limited thereto.

Receiving from outside may be receiving from other communication devices, such as from an access network device, a core network device, or a terminal device, and so on.

Receiving from the communication device per se may be that the first information or the survival time can be provided by the communication device itself, for example, an application layer of a terminal device can provide the survival time, or may be that the first information or the survival time is previously received and stored locally.

Figure 4:
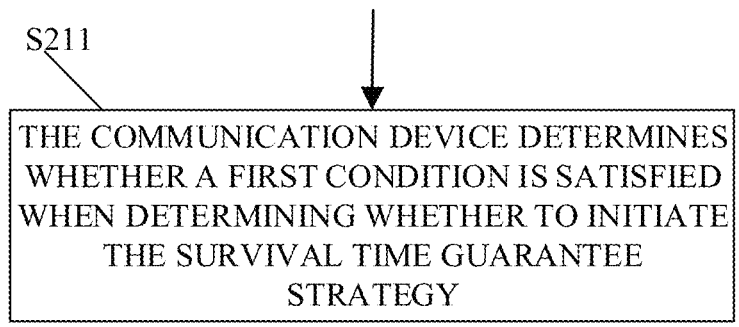
FIG. 4 is a schematic flowchart of a communication method according to another implementation of the disclosure.

Optionally, the communication method according to an implementation of the disclosure may further include the following, as illustrated in FIG. 4.

S211, determine whether a first condition is satisfied when determining whether to initiate the survival time guarantee strategy.

Specifically, it can be comprehended that, when determining whether to initiate the survival time guarantee strategy, the communication device may first determine whether the first condition is satisfied.

Or, it can be comprehended that, the communication device first determines whether the first condition is satisfied, so as to determine whether to initiate the survival time guarantee strategy.

In other words, it can be comprehended that, first determine whether the first condition is satisfied, and then determine whether to initiate the survival time guarantee strategy according to the result of the determination regarding the first condition.

To be summarized, in this disclosure, whether to initiate the survival time guarantee strategy can be determined directly, or, whether the first condition is satisfied can be determined first, so as to determine whether to initiate the survival time guarantee strategy.

Optionally, the communication device can determine according to the first information whether the first condition is satisfied.

Optionally, the first condition may include at least one of the following: a survival time is indicated to the communication device; the communication device is configured with the survival time; the communication device is instructed to initiate the survival time guarantee; the communication device is configured to initiate the survival time guarantee strategy.

As can be seen, the first condition can be a condition regarding the survival time, or in other words, the first condition is a condition regarding the survival time or the survival time guarantee strategy. The first condition is not limited thereto.

As can be seen, if one of the above items is satisfied, it may be considered that the first condition is satisfied. In terms of which item(s) is/are satisfied specifically to qualify satisfying the first condition, it can be determined according to situations or requirements. For example, the first condition is satisfied if the survival time is indicated to the communication device. Or, the first condition is satisfied if the communication device is configured with the survival time and configured to initiate the survival time guarantee strategy. As such, which case qualifies satisfying the first condition can be determined according to requirements and actual situations, which is not limited herein.

By checking whether the first condition is satisfied, whether the communication device is currently sufficient to support a survival condition and/or a survival condition guarantee strategy can be determined, so as to provide support and assurance for subsequent aspects, thereby making subsequent processes more smooth.

Furthermore, in terms of "the communication device is instructed to initiate the survival time guarantee strategy" and "the communication device is configured to initiate the survival time guarantee strategy", initiating of the survival time guarantee strategy can be indicated (instructed) or configured through the "first indication".

Optionally, the foregoing communication device can be a terminal device or an access network device.

In other words, the communication device which can implement the communication method provided herein is not limited to a terminal device such as a user equipment (UE), but can be other communication devices, such as an access network device, a core network device, and so on.

The communication device can serve as a transmitter or a receiver, which is not limited herein. In other words, determination regarding the survival time or first condition or first behavior as well as any operation before or after the determination, can be performed by the communication device, that is, the communication device can perform the communication method as being a transmitter, or the communication device can perform the communication method as being a receiver, which will be detailed later.

Figure 5:
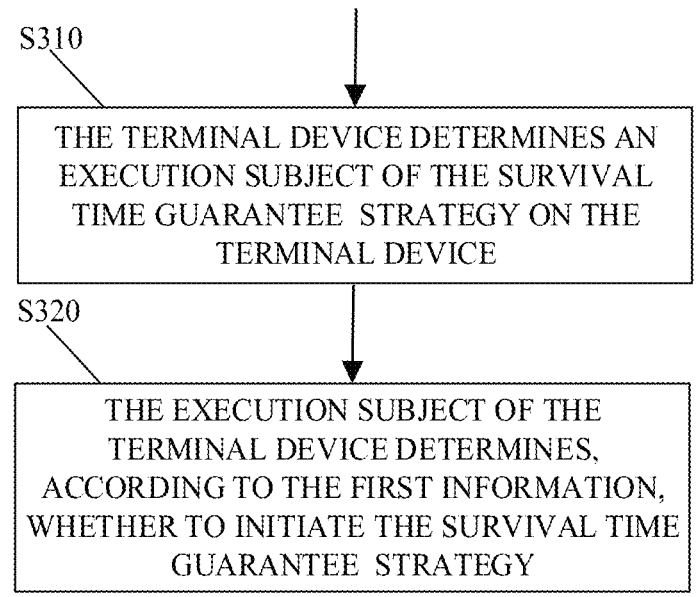
FIG. 5 is a schematic flowchart of a communication method according to another implementation of the disclosure.

When the communication device is a terminal device, the communication method according to implementations include the following, as illustrated in FIG. 5.

S310, the terminal device determines an execution subject of the survival time guarantee strategy on the terminal device.

Optionally, the execution subject can be an access stratum (AS) of the terminal device. That is, the AS of the terminal device can execute the survival time guarantee strategy by itself.

Optionally, the execution subject can be the AS of the terminal device and a higher layer of the terminal device. That is, the AS of the terminal device and the higher layer of the terminal can execute the survival time guarantee strategy together, which will be detailed later.

The AS includes at least one of: a media access control (MAC) layer, a packet data convergence protocol (PTCP) layer, and a radio link control (RLC) layer. That is, the AS can be any one of or any combination of the MAC layer, the PTCP layer, and the RLC layer, which is not limited herein, as long as the survival time guarantee strategy can be executed.

The higher layer of the terminal device includes at least one of: a device-side transmission sequence number (TSN) translator (DS-TT) layer, a non-access stratum (NAS), and an application layer. That is, the higher layer of the terminal device can be any one of or any combination of the DS-TT layer, the NAS, and the application layer, which is not limited herein, as long as the survival time guarantee strategy can be executed.

In addition, the AS and higher layer described in the disclosure are not limited to those listed above, but may also be other layers or functional modules belonging to the AS or higher layer in the communication device, that is, the meaning of the AS and higher layer herein should be understood broadly, as long as the required functions can be realized, and should not be limited to the existing terms or technologies.

The communication method 300 according to implementations of the disclosure may further include the following.

S320, the execution subject on the terminal device determines, according to first information, whether to initiate the survival time guarantee strategy.

Optionally, when the execution subject on the terminal device is the AS, the AS being the execution subject can determine, according to the first information, whether to initiate the survival time guarantee strategy.

Optionally, when the execution subject on the communication device is the AS and the higher layer of the terminal device, the higher layer of the terminal device can determine, according to the first information, whether to initiate the survival time guarantee strategy.

Optionally, when the higher layer of the terminal device determines to initiate the survival time guarantee strategy, the higher layer can send indication information as a second indication to the AS of the terminal device, so as to configure or indicate initiating or enablement of the survival time guarantee strategy.

The second indication is similar to the first indication, and is used to configure or indicate initiating of the survival time guarantee strategy. In other words, similar to the first indication, the second indication can also be contained in the first information.

Alternatively, the second indication can also be separate information, that is, the second indication is not contained in the first information. In this case, the first information can be obtained from the second indication.

Optionally, the AS of the terminal device can determine to initiate the survival time guarantee strategy, in response to receiving the second indication from the higher layer of the terminal device.

Here, the higher layer of the terminal device can send to the AS indication information for configuring or instructing the initiating of the survival time guarantee strategy, and accordingly, the AS can determine to initiate the survival time guarantee strategy according to the indication information received.

The term "configure" above may mean, for example, providing the required information or corresponding information. For example, "configure initiating of the survival time guarantee strategy" means information required for initiating the survival time guarantee strategy or corresponding information (indication information, such as survival time, timer duration, and so on) is provided to the AS. After receiving the indication information, the AS can make required or corresponding configuration or perform required or corresponding operations according to the indication information.

Regarding the term "indicate", it may represent sending instructions. For indication information instructing the initiating of the survival time guarantee strategy, it may represent providing an instruction (indication information) for initiating the survival time guarantee strategy to the AS. In addition, after receiving the indication information, the AS may initiate the survival time guarantee strategy.

The terms "configure" and "indicate" are explained above by way of example to make it easier to understand, however, those skilled in the art understand that these exemplary explanations should not constitute limitations to the technical solutions of the present disclosure.

Figure 6:
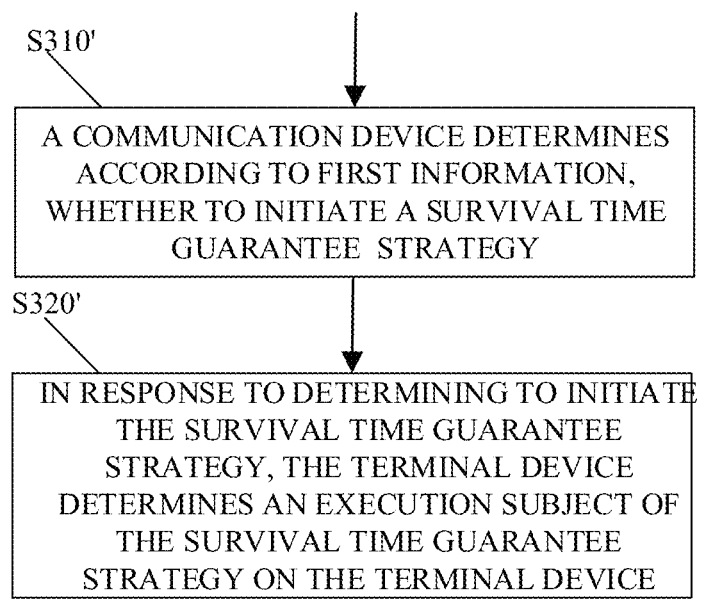
FIG. 6 is a schematic flowchart of a communication method according to another implementation of the disclosure.

The method is not necessarily limited to the described steps, but can be changed in order. For example, a communication method according to an implementation of the disclosure may include the following contents, as illustrated in FIG. 6.

S310', the terminal device determines, according to first information, whether to initiate the survival time guarantee strategy.

S320', when determining to initiate the survival time guarantee strategy, the terminal device determines an execution subject of the survival time guarantee strategy on the terminal device.

In this implementation, whether to initiate the survival time guarantee strategy is determined first, and then the execution subject of the survival time guarantee strategy is determined, which is contrary to the previous implementation in which the execution subject is determined first and then whether to initiate the survival time guarantee strategy is determined.

Optionally, when the AS or higher layer of the terminal device determines to initiate the survival time guarantee strategy, a timer corresponding to the survival time will be started.

Optionally, when determining to initiate the survival time guarantee strategy, the terminal device reports feedback information related to satisfaction of the survival time to the communication network, and the communication network adopts a corresponding guarantee measure based on the received feedback information.

The guarantee measure may include but not limited to QoS guarantee measure.

As stated before, when the communication device is the terminal device, the execution subject of the survival time guarantee strategy can be the AS of the terminal device, or can be the AS and higher layer of the terminal device. Correspondingly, optionally, when the communication device is the access network device, the execution subject of the survival time guarantee strategy can be the access network device, or can be the access network device and at least one core network device associated with the access network device.

Optionally, when the execution subject is the access network device, whether to initiate the survival time guarantee strategy can be determined by the access network device.

Optionally, when the execution subject is the access network device and at least one core network device associated with the access network device, whether to initiate the survival time guarantee strategy can be determined by the core network device.

When the core network device determines to initiate the survival time guarantee strategy, the core network device can send indication information as a third indication to the access network device, to configure or indicate initiating of the survival time guarantee strategy.

In response to receiving the third indication from the core network device, the access network device determines to initiate the survival time guarantee strategy.

Similar to the first indication and the second indication, the third indication can be used to configure or indicate initiating of the survival time guarantee strategy. That is to say, the third indication can be contained in the first information.

The third indication can also be separate information, that is, does not contained in the first information. In this case, the first information can be information obtained from the third indication directly or indirectly.

Optionally, when the access network device or the core network device determines to initiate the survival time guarantee strategy, a timer corresponding to the survival time will be started.

Optionally, when the communication device serve as a receiver of a packet or burst, the timing satisfying the survival time can include at least one of the following: every time a packet or burst is received; when determining that first packet or burst reception failure occurs; when the number of consecutive reception failures is greater than one and equal to or less than a maximum allowable number of consecutive reception failures; and when determining that next packet or burst needs to be received successfully.

Optionally, the communication device as the receiver can transmit as least one of the following to the communication network: feedback information of a packet or burst reception failure; feedback information that the survival time is not satisfied; behavior request or behavior indication related to the survival time; and feedback information required for the survival time guarantee strategy.

By sending at least one of the above information to the communication network, the communication network can know the current status of the communication device serving as the receiver and take appropriate countermeasures.

Optionally, when the communication device serves as a transmitter of a packet or burst, the timing satisfying the survival time can include at least one of the following: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

As described before, since the survival time can be counted according to the transmission time of the packet or burst, the timing satisfying the survival time can be determined according to the transmission situation of the packet or burst.

Optionally, the communication device as the transmitter can sent at least one of the following to the communication network: feedback information of a packet or burst transmission failure; feedback information that the survival time is not satisfied; behavior request or behavior indication related to the survival time; and feedback information required for the survival time guarantee strategy.

Optionally, a timer corresponding to the survival time can be started if the communication device determines to initiate the survival time guarantee strategy.

Optionally, determine to initiate the survival time guarantee strategy when the communication device starts the timer corresponding to the survival time.

Optionally, determine to initiate the survival time guarantee strategy if the timer corresponding to the survival time of the communication device times out.

Optionally, a timing when the timer is started comprises at least one of: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

Optionally, the communication device is configured to execute the first behavior in at least one of the timings: after the timer is started; during running of the timer; at a specific time before the timer expires; at a specific time after the timer times out or stopped; and at a specific time after the timer expires.

The present disclosure provides at least one communication method for supporting survival time by means of the described various exemplary implementations.

By determining whether to initiate the survival time guarantee strategy based on the first information, for example, evaluation on the possibility and necessity of initiating the survival time guarantee strategy can be realized, so that survival time is supported more pertinently, and the communication service has higher efficiency and higher transmission accuracy.

In addition, by determining whether the first condition associated with the survival time and/or the survival time guarantee strategy is satisfied, the likelihood, necessity, etc. currently supporting the survival time and/or survival time guarantee strategy can be more explicit. In this way, the survival time and/or survival time guarantee strategy are more specifically supported. Thus, the communication service is more efficient and the transmission accuracy is higher.

Based on this, how to support survival time will be described below with reference to specific examples.

Example 1

Figure 7A:
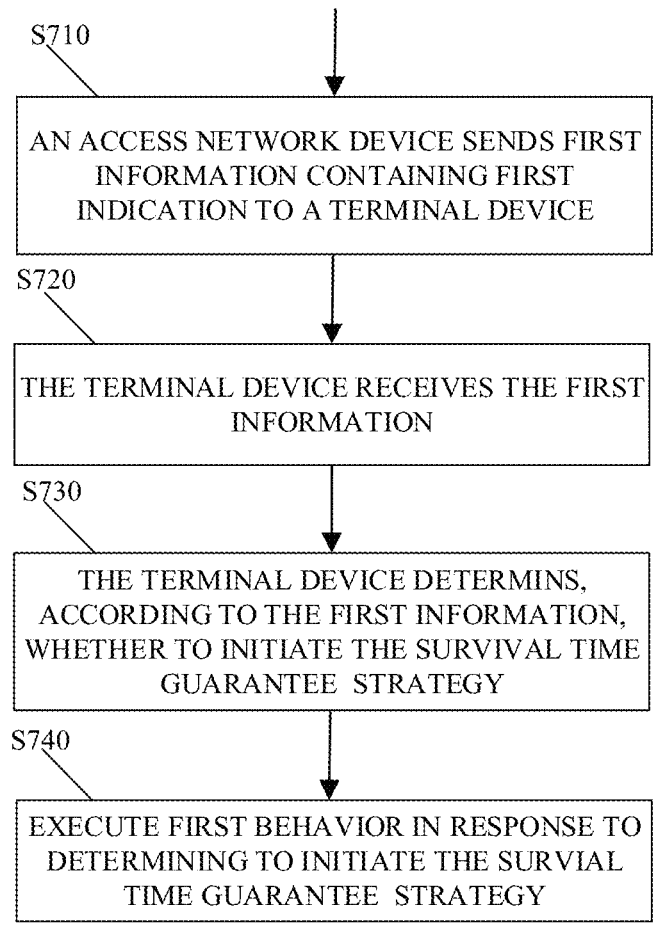
FIG. 7A is a schematic flowchart of a communication method according to another implementation of the disclosure.

Reference is made to FIG. 7A, and the technical solution provided in this example can include the following.

S710, an access network device (such as a base station or a serving cell) sends first information to a terminal device (such as a UE), where the first information contains first indication for indicating the configuration or initiating of a survival time guarantee strategy.

In this example, the first information containing the first indication is sent to the terminal device by the access network device, however, the disclosure is not limited thereto, the first information can also be obtained by the terminal device from the terminal device itself.

In this example, the first information contains the first indication, and the first indication is for configuring or indicating initiating of the survival time guarantee strategy.

S720, the terminal device UE receives the first information.

S730, the terminal device UE determines, according to the first information, whether a first object will initiate the survival time guarantee strategy.

Specifically, for example, the UE determines, based on the first indication in the first information received, whether the first object will initiate the survival time guarantee strategy.

As mentioned before, the survival time guarantee strategy may include at least one of: a survival time is satisfied, or a first behavior is executed.

Optionally, the communication method according to implementations of the disclosure may further include S740.

S740, execute the first behavior in response to determining that the survival time guarantee strategy is to be initiated.

Figure 7B:
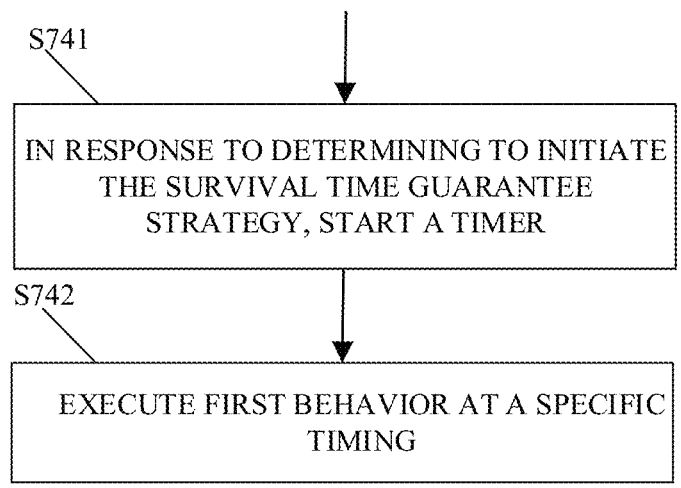
FIG. 7B is a schematic flowchart of a communication method according to another implementation of the disclosure.

Optionally, S740 may include S741 and S742, as illustrated in FIG. 7B. S741 and S742 will be detailed later.

Figure 8:
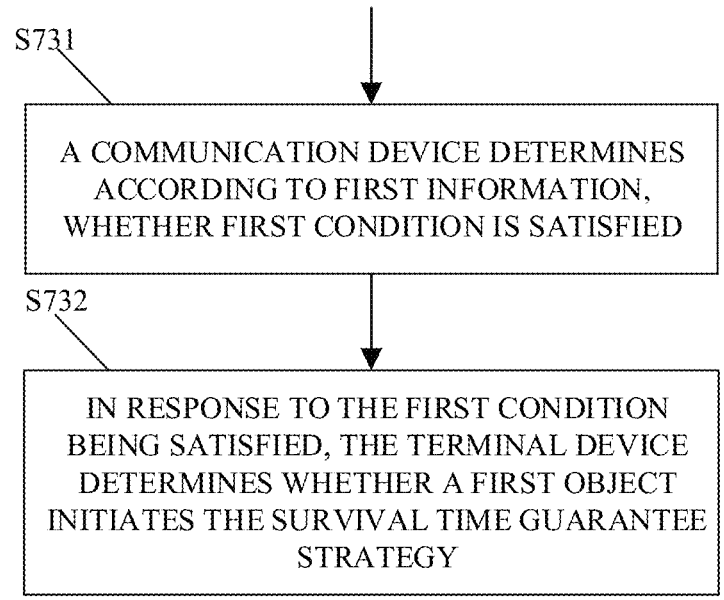
FIG. 8 is a schematic flowchart of a communication method according to another implementation of the disclosure.

Optionally, S730 may include the following, as illustrated in FIG. 8.

S731, the terminal device UE determines, according to the first information, whether the first condition is satisfied.

The first condition may include at least one of the following: a survival time is indicated to the UE; the UE is configured with the survival time; the UE is instructed to initiate the survival time guarantee strategy; and the UE is configured to initiate the survival time guarantee strategy.

According to the first indication in the first information, the UE can know whether itself satisfies the first condition.

S732, in response to the first condition being satisfied, the terminal device UE determines whether a first object will initiate the survival time guarantee strategy.

That is, if the UE determines according to the first information that the first condition is satisfied, the UE can determine whether to initiate the survival time guarantee strategy, that is, whether the survival time is to be satisfied and/or whether the first behavior is to be executed.

As stated before, the survival time can be related to a traffic cycle.

For example, the survival time can correspond to a maximum allowable time (or duration) of consecutive transmission failures. When the traffic cycle is a burst transmission period, the survival time can correspond to a maximum allowable time (or duration) of consecutive burst transmission failures. When the traffic cycle is a packet transmission period, the survival time can correspond to a maximum allowable time (or duration) of consecutive packet transmission failures.

Furthermore, the survival time may also correspond to a maximum allowable number of consecutive transmission failures. When the traffic cycle is a burst transmission period, the survival time can correspond to a maximum allowable number of consecutive burst transmission failures. When the traffic cycle is a packet transmission period, the survival time can correspond to a maximum allowable number of consecutive packet transmission failures.

For example, when the survival time is characterized by the maximum allowable number of consecutive burst transmission failures, if the survival time is represented with X (X can be an integer or a non-integer), it means that when consecutive X−1 or X burst transmission failures occurs (when X is a non-integer, X−1 or X may be an integer value obtained by rounding), the next burst transmission needs to be successful, otherwise, the communication traffic transmission fails.

Similarly, when the survival time is characterized by the maximum allowable number of consecutive packet transmission failures, if the survival time is represented with L (L can be an integer or a non-integer), it means that when consecutive L−1 or L packet transmission failures occurs (when L is a non-integer, L−1 or L may be an integer value obtained by rounding), the next packet transmission needs to be successful, otherwise, the communication traffic transmission fails.

Specifically, if the survival time is one traffic cycle, it can be considered that the above maximum allowable time is one traffic cycle or the maximum allowable number of consecutive transmission failures is 1.

Specifically, if the survival time is two traffic cycles, it means that consecutive two transmission failures are not allowed.

The above are examples and should not be construed as limiting the disclosure.

Whether the survival time is satisfied can be determined by determining whether it is a timing satisfying the survival time.

As mentioned before, the timing satisfying the survival time may include at least one of the following: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

As described before, since the survival time can be based on transmission of packets or transmission of bursts, whether it is a timing satisfying the survival time can also be determined based transmission of packets or transmission of bursts.

In this disclosure, optionally, the first behavior may include a monitoring behavior and/or a guarantee behavior related to the survival time, for example, may include but not limited to a quality of service (QoS) monitoring behavior and/or a guarantee behavior related to the survival time.

Optionally, the first behavior may include at least one of the following: sending feedback information related to the survival time or the survival time guarantee strategy to the communication network; adjusting or selecting a resource for prioritized transmission; adjusting a logical channel mapping constraint; adjusting or selecting a logical channel mapping parameter; adjusting or selecting a QoS parameter, where the QoS parameter includes at least one of a reliable transmission parameter and a transmission priority; adjusting a serving cell; adjusting a transmission bandwidth; and starting or maintaining a timer corresponding to the survival time.

In this disclosure, determining whether the survival time is satisfied is independent from determining whether the first behavior is to be executed. No matter whether or not the survival time is satisfied, whether the first behavior is to be executed can be determined according to situations. Similarly, no matter whether or not the first behavior is to be executed, whether the survival time is satisfied may be determined.

In this disclosure, the first object may include an application-level transfer object. Optionally, the application-level transfer object includes at least one of: a UE; a user data radio bearer (DRB); a QoS flow; a time-sensitive networking (TSN) flow; and a packet data unit (PDU) session.

Namely, in the disclosure, not only the terminal device can satisfy the survival time, but also other application-level transfer objects can satisfy the survival time. That is to say, the disclosure can support numerous application-level transfer objects to ensure the transmission quality related to the survival time.

Figure 9:
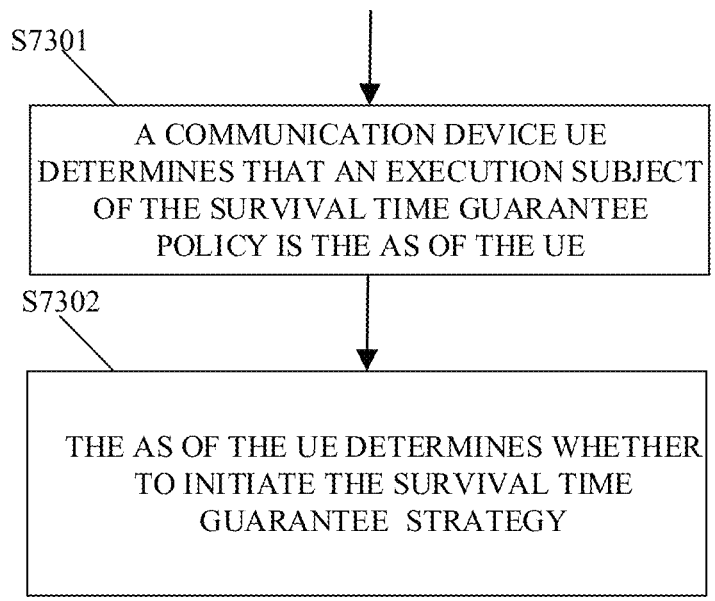
FIG. 9 is a schematic flowchart of a communication method according to another implementation of the disclosure.

Optionally, the communication method according to implementations of the disclosure includes the following, as illustrated in FIG. 9.

S7301, the terminal device UE determines that the execution subject of the survival time guarantee strategy is the AS of the UE.

In this example, the AS of the UE is determined as the execution subject.

Optionally, the AS includes at least one of: a media access control (MAC) layer, a packet data convergence protocol (PTCP) layer, and a radio link control (RLC) layer.

S7302, the AS of the UE determines whether to initiate the survival time guarantee strategy.

Optionally, in this example, when the execution subject is the AS of the terminal device, the AS of the terminal device being the execution subject can determine whether to initiate the survival time guarantee strategy.

S7301 and S7302 may correspond to the above steps S730 or S732.

In addition, as described before, optionally, the communication method according to implementations of the disclosure may include S740 (execute the first behavior in response to determining to initiate the survival time guarantee strategy), as illustrated in FIG. 7A.

Optionally, for various possible first behaviors, "sending feedback information related to the survival time or the survival time guarantee strategy to the communication network" can be executed by the communication device, for example, can be executed by the AS of the UE, "adjusting or selecting a resource for prioritized transmission", "adjusting a logical channel mapping constraint", "adjusting or selecting a logical channel mapping parameter", "adjusting or selecting a QoS parameter", "adjusting a serving cell", "adjusting a transmission bandwidth" or other behaviors can be executed by the network device or executed by the communication device under control of the network device, such as executed by the AS of the UE; "starting or maintaining a timer corresponding to the survival time" can also be executed by the network device or executed by the communication device under control of the network device, such as executed by the AS of the UE.

Optionally, as described before, S740 may include S741 and S742, as illustrated in FIG. 7B.

S741, a timer corresponding to the survival time is started in response to determining to initiate the survival time guarantee strategy.

Optionally, in this disclosure, S741 may be after S730 or S732. That is, the timer corresponding to the survival time can be started after the survival time guarantee strategy is initiated, to facilitate monitoring.

For example, the timer may be started by the UE AS serving as the execution subject, that is, the timer may be started by the UE AS no matter whether the execution subject is the UE AS only or the execution subject is the UE AS and a higher layer of the UE as mentioned in Example 2 later. However, the present disclosure is not limited thereto, and the timer corresponding to the survival time may also be started by other functional modules/layers.

The timing for starting the timer may include at least one of: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

S742, the first behavior is executed at a specific timing.

In this disclosure, the timer corresponding to the survival time can be started after determining to initiate the survival time guarantee strategy, so as to facilitate monitoring the communication quality. The first behavior is executed at a timing related to the timer (that is, a condition related to the timer and for triggering execution of the first behavior). However, the first behavior can be executed no matter whether or not the timer is started.

Optionally, the communication device is configured to execute the first behavior in at least one of the timings: after the timer is started; during running of the timer; at a specific time before the timer expires; at a specific time after the timer times out or stopped; and at a specific time after the timer expires.

Specifically, when the timer expires, during running of the timer (for example, immediately after the time is started or after a specific period after starting is elapsed), at a specific time before the timer times out (for example, the specific time is "the duration of the timer minus one traffic cycle", that is, the last traffic cycle), the UE needs to ensure a survival time requirement or needs to ensure correct transmission of next packet, and the UE can execute the first behavior.

For example, when the timer expires, it is considered that the survival time requirement cannot be ensured, and therefore, it needs to be ensured that the packet or burst before the timer times out is successfully transmitted. In other words, the first packet or burst after the expiration of the timer needs to be transmitted successfully, or preferably the packet or burst before the timeout of the timer needs to be transmitted successfully, otherwise it can be considered that the survival time requirement is not ensured. That is, it is required to execute the first behavior before the survival requirement is ensured, so as to better ensure the survival time requirement.

Optionally, the time when the survival-time times out can be determined according to the time of occurrence of subsequent data and/or duration of the timer (time-length of the timer). That is, the time when the survival-time times out can be determined according to the survival time of the timer only, or the time when the survival-time times out can be determined according to the duration of the timer and the time of occurrence of subsequent data, or the time when the survival-time times out can be determined according to the time of occurrence of subsequent data. This disclosure is not limited in this regard.

For the described first behavior, more specifically, for example, during running of the corresponding timer, the UE may select second reliable transmission parameter rather than first reliable transmission parameter, or may adjust the reliable transmission parameter, for example, a lower-order modulation and coding scheme (MCS), more retransmissions, and the like.

Still another example, during running of the timer corresponding to the survival time or after the timer is started, or before the timer corresponding to the survival time times out, the UE can make transmission by means of copy transmission activation.

Still another example, as mentioned before, when the timer corresponding to the survival time is started or times out, UE can report to the network issues or requirements related to the survival time, to expect the network to give instructions or make adjustments.

Still another example, when a first packet (or burst, which is not limited herein) of transmission failure is received by the AS of the UE serving as the receiver, the timer corresponding to the survival time is started and timing of the timer is started, and based on the arrival time of next packet (that is, the moment, which is one transmission interval later than the first packet of transmission failure is received, can be used as an auxiliary parameter) and/or the time when the timer times out, execute the first behavior or determine whether to execute the first behavior.

In addition, as can be seen from the above, although the timer corresponding to the survival time may have been started before the first behavior is executed, there may be more than one timer corresponding to the survival time. For example, a timer corresponding to the survival time may be started when first transmission failure occurs, and a timer corresponding to the survival time may be started when consecutive N (for example, N is greater than 1 and less than or equal to the maximum allowable number of times of consecutive transmission failures) transmission failures occur, for example, when N=2, a corresponding timer may be started, and when N=3, a corresponding timer may be started. In conclusion, the number of timers started may be flexible and is not necessarily limited to one timer, and therefore, various situations related to "executing the first behavior" do not conflict.

More specific examples are given below.

For example, if the AS of the UE serving as a receiver receives first transmission failure packet, a timer corresponding to the survival time is started and timing of the timer is started (preferably, a moment when a next packet arrives (the moment may be used as an auxiliary parameter) and/or a time when the timer times out may also be provided), and a first behavior may be executed or whether to execute the first behavior may be determined.

For another example, if the AS of the UE serving as the receiver receives first transmission failure packet, the timer corresponding to the survival time is started and the timing of the timer is started. Furthermore, according to time of arrival (namely, the described auxiliary parameter) of the next packet, the first behavior can be performed at the last tolerated moment, for example, which is a moment of "duration of the survival time minus one traffic cycle" or a moment of occurrence of consecutive N−1 packet transmission failures (where N is the maximum allowable number of consecutive packet transmission failures).

In this disclosure, the above operation can also be performed with regard to a burst, which is not limited herein.

Optionally, the first behavior can be performed by the AS of the UE.

Specifically, for example, when the UE serves as the receiver, the UE can notify the network side, and the network can take corresponding measures in subsequent data transmission, for example, QoS guarantee measures, which includes but not limit to more repetitions, lower-order MCS, PDCP duplication, higher-priority resource preempted, etc.

When the base station serves as the receiver, the base station can take measures similarly, the base station does not have to report to the network, or the base station may report to the core network device. The quality measures may include the foregoing mentioned more repetitions, lower-order MCS, PDCP duplication, higher-priority resource preempted, etc.

In this example, a communication method which can support and guarantee the survival time at a terminal (specifically, at the AS of the UE) is provided, as such, it is possible to reduce the transmission error rate and guarantee or provide better transmission quality.

As mentioned before, the first information may contain the first parameter, and the first parameter may include at least one of the following: the survival time; a DRB identifier (ID); a QoS flow ID; a TSN flow ID; a PDU session ID; a time of arrival of traffic; a traffic cycle; and a traffic mode.

The first parameter and the first indication can be contained in the first information separately, or the first parameter and the first indication can be contained in the first information at the same time. In addition, the first parameter and the first indication can be different parts of the first information, or the first indication may be contained in the first parameter or the first parameter is contained in the first indication. Regarding forms of the first parameter and the first indication, the disclosure is not particularly limited as long as their contents are qualified.

Example 2

The difference between this example and Example 1 mainly lies in that the execution subject determined in Example 1 is the AS of the UE, but in this example, both the AS of the UE and a higher layer of the UE are determined as the execution subject. The differences between Example 1 and Example 2 are given blow, and the same or similar parts will not be repeated here.

Figure 10:
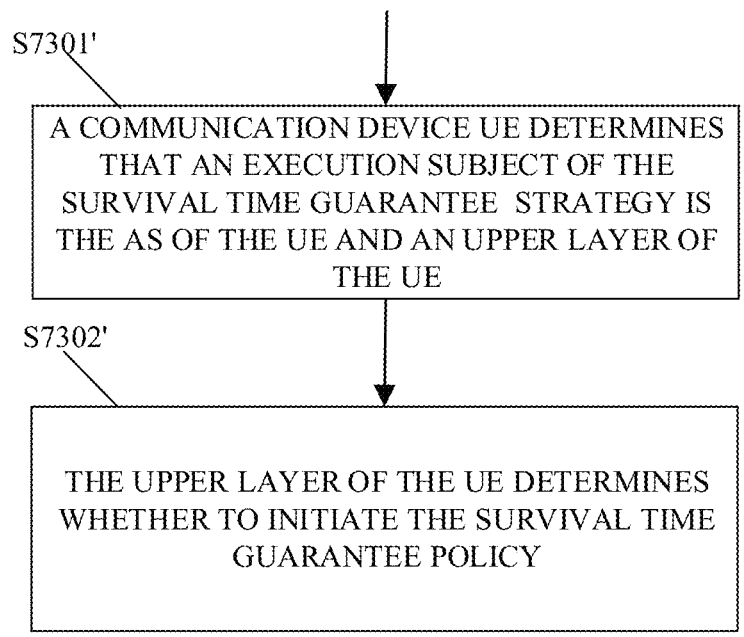
FIG. 10 is a schematic flowchart of a communication method according to another implementation of the disclosure.

Similarly, in S730 or S732 and so on, the UE can determine whether to initiate the survival time guarantee strategy as follows, as illustrated in FIG. 10.

S7301', the UE determines that the execution subject of the survival time guarantee strategy is the AS of the UE and the higher layer of the UE.

In this example, the AS of the UE and the higher layer of the UE are determined as the execution subject, that is, the AS of the UE and the higher layer of the UE coordinate with each other to execute the survival time guarantee strategy.

Optionally, examples of the higher layer of the UE include a DS-TT layer, a NAS, and an application layer, but the disclosure is not limited thereto.

S7302', the higher layer of the UE determines whether to initiate the survival time guarantee strategy.

Optionally, when the execution subject is the AS of the UE and the higher layer of the UE, whether to initiate the survival time guarantee strategy can be determined by the higher layer of the UE.

Optionally, as illustrated in FIG. 7A, the communication method according to implementations of the disclosure may for example further include S740. In this example, such step may also be included.

In this example, similarly, in S740, execute the first behavior in response to determining that the survival time guarantee strategy is to be initiated.

Optionally, in this example, for various possible first behaviors, "sending feedback information related to the survival time or the survival time guarantee strategy to the communication network" can be executed by the communication device, for example, can be executed by the AS of the UE, "adjusting or selecting a resource for prioritized transmission", "adjusting a logical channel mapping constraint", "adjusting or selecting a logical channel mapping parameter", "adjusting or selecting a QoS parameter", "adjusting a serving cell", "adjusting a transmission bandwidth" or other behaviors can be executed by the network device or executed by the communication device under control of the network device, such as executed by the AS of the UE or the higher layer of the UE; "starting or maintaining a timer corresponding to the survival time" can also be executed by the network device or executed by the communication device under control of the network device, such as executed by the AS of the UE or the higher layer of the UE.

Optionally, the above-mentioned S740 may similarly include the following (as shown in FIG. 7B).

S741, in response to determining to initiate the survival time guarantee strategy, start a timer corresponding to the survival time.

S742, execute the first behavior at a specific timing.

Optionally, the timer corresponding to the survival time can be started by the AS of the UE or the higher layer of the UE.

Optionally, when the higher layer of the UE determines to initiate the survival time guarantee strategy, the higher layer of the UE can send indication information as a second indication to the AS of the UE, to configure or indicate initiating of the survival time guarantee strategy.

Optionally, in response to receiving the second indication from the higher layer of the UE, the AS of the UE can determine to initiate the survival time guarantee strategy.

Each step in this example is described in detail for the convenience of understanding. A person skilled in the art should understand that these steps are not all necessary, and the order of these steps is also exemplary; therefore, the order of the steps can be adjusted according to situations.

In addition, in this example, S740 may also be performed after S730 or S732. That is, the timer corresponding to the survival time can be started after the survival time guarantee strategy is initiated to facilitate monitoring of communication quality, and the first behavior will be executed at a timing related to the timer (a condition related to the timer and for triggering execution of the first behavior). However, the first behavior can be executed no matter whether or not the timer is started.

As described before, the communication device can execute the first behavior at a specific timing.

Optionally, the first behavior can be executed in at least one of the following timings: when the timer is started; after the timer is started; during running of the timer; at a specific time before the timer expires; at a specific time after the timer times out or stopped; and at a specific time after the timer expires.

Optionally, for various possible first behaviors, "sending feedback information related to the survival time or the survival time guarantee strategy to the communication network" can be executed by the AS of the UE or the higher layer of the UE, "adjusting or selecting a resource for prioritized transmission", "adjusting a logical channel mapping constraint", "adjusting or selecting a logical channel mapping parameter", "adjusting or selecting a QoS parameter", "adjusting a serving cell", "adjusting a transmission bandwidth" or other behaviors can be executed by the network device or executed by the communication device under control of the network device, such as executed by the AS of the UE or the higher layer of the UE; "starting or maintaining a timer corresponding to the survival time" can also be executed by the network device or executed by the communication device under control of the network device, such as executed by the AS of the UE or the higher layer of the UE.

Interactions between the higher layer of the UE and the AS of the UE will be further detailed below.

First, the higher layer of the UE sends indication information and/or auxiliary information as a second indication to the AS of the UE, such that the AS of the UE execute the first behavior.

The indication information and/or auxiliary information may be information related to the survival time. Specifically, the indication information as the second indication is similar to the first indication and therefore will be not repeated herein. The auxiliary information can be used to provide the above mentioned specific time, or other information such as failing to satisfy the survival time. The auxiliary information can serve as the indication information of the second indication or as part thereof.

After the AS of the UE receives the indication information and/or auxiliary information from the higher layer of the UE, the UE execute the first behavior or execute the first behavior for the first object; or the UE execute the first behavior or execute the first behavior for the first object when the UE determines according to the information that the first condition is satisfied.

For example, when receiving the indication information and/or auxiliary information from the higher layer of the UE (such as NAS of the UE or the DS-TT of the UE), the UE may select second reliable transmission parameter rather than first reliable transmission parameter, or may adjust the reliable transmission parameter (for example, a lower-order MCS, more retransmissions, and the like).

As another example, when receiving the indication information and/or auxiliary information from the higher layer of the UE, the UE may report to the network to trigger network regulation and guarantee the survival time.

A more specific example is given below.

For example, if the application layer (higher layer) of the UE serving as the receiver receives first failure packet, a timer corresponding to the survival time is started for timing, and the application layer of the UE notifies the AS of indication information about the start of the timer. In other words, in this example, the AS layer does not need to evaluate by itself, but can directly follow an indication from the higher layer (here the application layer). When the indication is provided by the application layer of the UE, preferably, the moment of occurrence of the next packet and/or the time when the timer times out can be provided together, and the first behavior can be executed or whether to execute the first behavior can be determined.

For another example, if application layer (higher layer) of the UE serving as the receiver receives first failure packet, the timer corresponding to the survival time is started for timing. Furthermore, at the last tolerated moment, which is for example a moment of "duration of the survival time minus one traffic cycle" or a moment of occurrence of consecutive N−1 packet transmission failures (where N is the maximum allowable number of consecutive packet transmission failures), the application layer of the UE can notify the AS of indication of starting the timer, and when proving the indication information, the application layer of the UE may preferably provide the moment of occurrence of the next packet and/or the time when the timer times out together, and the first behavior can be executed.

Optionally, the first behavior can be executed by the higher layer of the UE or the AS of the UE.

Specifically, when the UE serves as the receiver, the UE (the higher layer or AS of the UE) can inform the network side, and the network will take corresponding guarantee measures on subsequent data transmission, such as QoS guarantee measures, which includes but not limited to more repetitions, lower-order MCS, PDCP duplication, higher-priority resource preempted, etc.

When the base station serves as the receiver, similar to the UE, the base station can take quality measures, the base station does not have to report to the network, or the base station may report to the core network device. The quality measures may include the foregoing mentioned more repetitions, lower-order MCS, PDCP duplication, higher-priority resource preempted, etc.

Compared with Example 1, in this example, a communication method in which the higher layer of the UE (such as the application layer of the UE) coordinates with the AS of the UE to support and guarantee the survival time is provided, which can reduce transmission error rate of and guarantee or provide better transmission quality.

Example 3

In the above Example 1 and Example 2, the method is described in a scenario where the terminal device UE serves as a receiving end (receiver), the terminal device UE however can also serve as a transmitting end (transmitter). In addition, as described before, the communication device performing the communication method is not limited to the UE, but can be any type of communication device, such as an access network device, a core network device, a terminal device, etc. The communication device can serve as a transmitter or receiver, which is not limited herein. In other words, determination regarding the survival time, determination regarding the first condition, determination regarding the first behavior, or any operation before or after such determination, can be determined by the communication device. That is, the communication device can perform the communication method as a transmitter, or the communication device can perform the communication method as a receiver, which will be elaborated through examples.

First, for the transmitter and receiver, the difference there between lies in the timing satisfying the survival time.

The timing satisfying the survival time is described above in the scenario where the communication device serves as the receiver. The scenario where the communication device serves as the transmitter will be introduced below.

Optionally, according to implementations of the disclosure, when the communication device being the terminal device UE or the access network device serves as the transmitter, the timing satisfying the survival time may include at least one of the following: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

As can be seen, for the transmitter, the timing satisfying the survival time depends on information related to transmission. Similarly, for the receiver, the timing satisfying the survival time depends on information related to reception.

In addition, for the communication device serving as the transmitter, similar to the receiver, the communication device can send at least one of the following to the communication network: feedback information of a packet or burst transmission failure; feedback information that the survival time is not satisfied; behavior request or behavior indication related to the survival time; and feedback information required for the survival time guarantee strategy.

However, when the access network device serving as the receiver or transmitter, there may be some difference from when the UE serving as the receiver or the transmitter.

For example, when the communication device is the access network device, the execution subject for the survival time guarantee strategy can be the access network device or can be the access network device and at least one core network device associated with the access network device.

When the execution subject is the access network device, the access network device determines whether to initiate the survival time guarantee strategy.

Further, when the execution subject is the access network device and at least one core network device associated with the access network device, the communication method may further include at least one of: the core network device determines whether to initiate the survival time guarantee strategy; when the core network device determines to initiate the survival time guarantee strategy, the core network device sends indication information as a third indication to the access network device, to configure or indicate initiating of the survival time guarantee strategy; and in response to receiving the third indication from the core network device, the access network device accordingly determines to initiate the survival time guarantee strategy.

The third indication is similar to the first indication and the second indication, and will not be repeated.

In addition, according to implementations of the disclosure, when the access network device or the core network device determines to initiate the survival time guarantee strategy, the timer corresponding to the survival time is started.

Other aspects of the communication method in this example is similar to those of Example 1 and Example 2, and will not be repeated to avoid redundancy.

Figure 11:
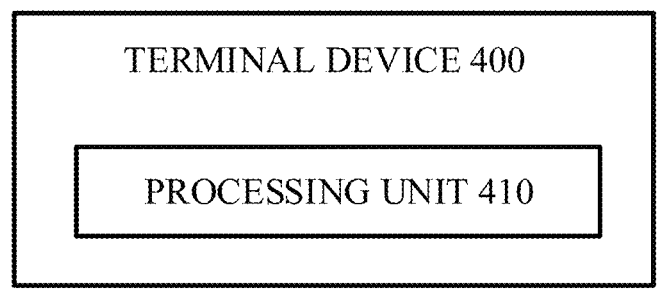
FIG. 11 is a schematic block diagram of a communication device according to an implementation of the disclosure.

FIG. 11 is a schematic block diagram of a communication device 400 according to an implementation of the disclosure. The communication device 400 can include a processing module 410.

The processing module is configured to: determine, according to first information, whether to initiate a survival time guarantee strategy.

The processing module is configured to determine whether to initiate a survival time guarantee strategy is configured to determine at least one of: whether a survival time needs to be satisfied; and whether to execute a first behavior.

The processing module configured to determine whether the survival time needs to be satisfied is configured to determine whether it is a timing satisfying the survival time.

The timing satisfying the survival time includes at least one of: every time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

Optionally, the processing module can be further configured to: execute the first behavior in response to determining to initiate the survival time guarantee strategy.

Optionally, the processing module can be further configured to: in response to initiating the survival time guarantee strategy, start a timer corresponding to the survival time; and execute the first behavior at a specific timing.

Optionally, the first behavior includes a monitoring behavior and/or a guarantee behavior related to the survival time.

The first behavior may include at least one of: sending feedback information related to the survival time or the survival time guarantee strategy to the communication network; adjusting or selecting a resource for prioritized transmission; adjusting a logical channel mapping constraint; adjusting or selecting a logical channel mapping parameter; adjusting or selecting a QoS parameter, where the QoS parameter includes at least one of a reliable transmission parameter and a transmission priority; adjusting a serving cell; adjusting a transmission bandwidth; and starting or maintaining a timer corresponding to the survival time.

Optionally, the processing module configured to whether initiate the survival time guarantee strategy can be configured to determine whether a first object initiates the survival time guarantee strategy.

Optionally, the first object includes an application-level transfer object, and the application-level transfer object includes at least one of: a UE, a DRB, a QoS flow, a TSN flow, and a PDU session.

Optionally, the first information contains first parameter.

The first parameter may include at least one of: a survival time, a DRB identifier (ID), a QoS flow ID, a TSN flow ID, a PDU session ID, a time of arrival of traffic, a traffic cycle, and a traffic mode.

Optionally, the first information contains a first indication, and the first indication is used to configure or indicate initiating of the survival time guarantee strategy.

Optionally, the processing module is further configured to determine whether a first condition is satisfied when determining whether to initiate the survival time guarantee strategy.

Optionally, the processing module is configured to determine whether the first condition is satisfied based on the first information.

Optionally, the first condition includes at least one of: a survival time is indicated to the communication device; the communication device is configured with the survival time; the communication device is instructed to initiate the survival time guarantee strategy; the communication device is configured to initiate the survival time guarantee strategy.

Optionally, the communication device can include as least one of: a terminal device, and an access network device.

Optionally, when the communication device is the terminal device, the processing module is further configured to: determine an execution subject of the survival time guarantee strategy on the terminal device.

Optionally, the processing module is configured to determine that the execution subject is an AS of the terminal device, or the processing module is configured to determine that the execution subject is the AS of the terminal device and a higher layer of the terminal device.

Optionally, the AS includes at least one of: an MAC layer, a PTCP layer, and a radio RLC layer.

The higher layer of the terminal device comprises at least one of: a DS-TT layer, a NAS, and an application layer.

Optionally, when the execution subject is the AS of the terminal device, the processing module is configured to cause the AS of the terminal device as the execution subject to determine whether to initiate the survival time guarantee strategy.

Optionally, the processing module is configured to perform at least one of: causing the higher layer of the terminal device to determine whether to initiate the survival time guarantee strategy, when the execution subject is the AS of the terminal device and the higher layer of the terminal device; sending indication information as a second indication to the AS of the terminal device, to configure or indicate initiating of the survival time guarantee strategy, when the higher layer of the terminal device determines to initiate the survival time guarantee strategy; causing the AS of the terminal device to determine to initiate the survival time guarantee strategy accordingly in response to receiving the second indication from the higher layer of the terminal device.

Optionally, the processing module is further configured to start a timer corresponding to the survival time when the AS of the terminal device or the higher layer of the terminal device determines to initiate the survival time guarantee strategy.

Optionally, the processing unit is configured to report feedback information related to satisfying of the survival time to a communication network when the survival time guarantee strategy is determined to be initiated, so that the communication network takes a corresponding guarantee strategy based on the feedback information received.

Optionally, when the communication device is the access network device, an execution subject of the survival time guarantee strategy is the access network device, or the execution subject of the survival time guarantee strategy is the access network device and at least one core network device associated with the access network device.

Optionally, when the execution subject is the access network device, whether to initiate the survival time guarantee strategy is determined by the access network device.

Optionally, when the execution subject is the access network device and at least one core network device associated with the access network device, at least one of the following is performed: the core network device determines whether to initiate the survival time guarantee strategy, and when the core network device determines to initiate the survival time guarantee strategy, send indication information as a third indication to the access network device, to configure or indicate initiating of the survival time guarantee strategy; and in response to receiving the third indication from the core network device, the access network device determines to initiate the survival time guarantee strategy.

Optionally, when the access network device or the core network device determines to initiate the survival time guarantee strategy, a timer corresponding to the survival time is started.

Optionally, when the communication device as the receiver of a packet or burst, the timing satisfying the survival time includes at least one of: every time a packet or burst is received; when determining that first packet or burst reception failure occurs; when the number of consecutive reception failures is greater than one and equal to or less than a maximum allowable number of consecutive reception failures; when determining that next packet or burst needs to be received successfully.

Optionally, the communication device as the receiver is configured to send at least one of the following to a communication network: feedback information of a packet or burst reception failure; feedback information that the survival time is not satisfied; behavior request or behavior indication related to the survival time; and feedback information required for the survival time guarantee strategy.

Optionally, the communication device is configured to start a timer corresponding to a survival time when determining to initiate the survival time guarantee strategy; or the communication device is configured to determine to initiate the survival time guarantee strategy when the timer corresponding to the survival time is started; or the communication device is configured to determine to initiate the survival time guarantee strategy when the timer corresponding to the survival time of the communication device times out.

Optionally, a timing when the timer is started comprises at least one of: very time a packet or burst is transmitted; when determining that first packet or burst transmission failure occurs; when the number of consecutive transmission failures is greater than one and equal to or less than a maximum allowable number of consecutive transmission failures; and when determining that next packet or burst needs to be transmitted successfully.

Optionally, the communication device is configured to execute the first behavior in at least one of the following timings: after the timer is started; during running of the timer; at a specific time before the timer expires; at a specific time after the timer times out or stopped; and at a specific time after the timer expires.

Optionally, the survival time is related to a traffic cycle. For example, the survival time may be an integral multiple or a non-integral multiple of the traffic cycle, but the present disclosure is not limited thereto.

Optionally, the survival time can be at least one of: a maximum allowable number of consecutive burst transmission failures; a maximum allowable time of consecutive burst transmission failures; a maximum allowable number of consecutive packet transmission failures; and a maximum allowable time of consecutive packet transmission failures.

Optionally, the first information or the survival time is received by the communication device from outside or from the communication device per se.

The communication device 400 according to implementations of the disclosure can implement corresponding functions of the communication device in the forgoing method implementation. For a procedure, a function, an implementation, and beneficial effects corresponding to each module (a sub-module, a unit, or a component) in the communication device 400, reference may be made to the corresponding description in the foregoing method implementations, and details are not repeatedly described herein. It should be noted that, the functions described for the modules (sub-modules, units or components) in the communication device 400 in the implementations of the disclosure may be implemented by different modules (sub-modules, units or components) or may be implemented by the same module (sub-modules, units or components).

Figure 12:
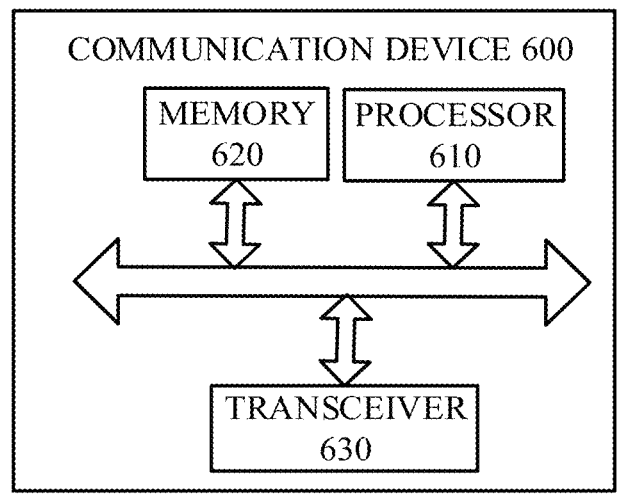
FIG. 12 is a schematic block diagram of a communication device according to another implementation of the disclosure.

FIG. 12 is a schematic structural diagram of a communication device 600 according to another implementation of the disclosure. The communication device 600 includes a processor 610, and the processor 610 may invoke and run a computer program from a memory, so that the communication device 600 performs the communication method in the implementation of the disclosure.

Optionally, the communication device 600 may further include a memory 620. The processor 610 is configured to invoke and run a computer program from the memory 620, so that the communication device 600 performs the communication method in the implementation of the disclosure.

The memory 620 may be a separate device independent of the processor 610, or may be integrated into the processor 610.

The communication device 600 can further include a transceiver 630. The processor 610 can control the transceiver 630 to communicate with other devices, specifically, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be the network device (such as the access network device or the core network device) in implementations of the disclosure, and the communication device 600 can implement the operations performed by the network device in various methods in implementations of the disclosure, which will not be repeated herein for the sake of simplicity.

Optionally, the communication device 600 may be the mobile terminal in implementations of the disclosure, and the communication device 600 can implement the operations performed by the terminal device in various methods in implementations of the disclosure, which will not be repeated herein for the sake of simplicity.

Figure 13:
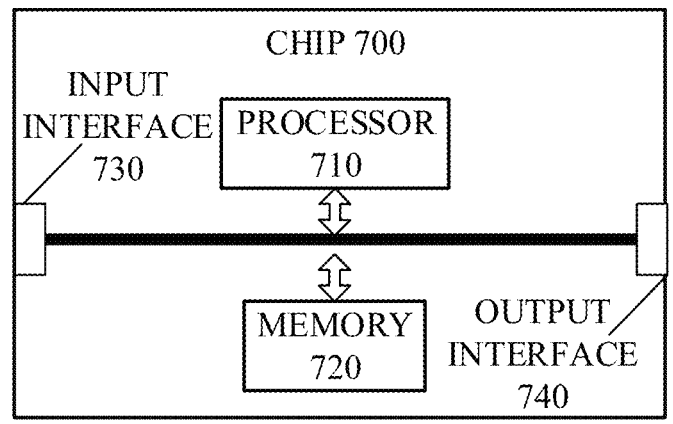
FIG. 13 is a schematic block diagram of a chip according to an implementation of the disclosure.

FIG. 13 is a schematic structural diagram of a chip 700 according to implementations of the disclosure. The chip 700 includes a processor 710. The processor 710 can invoke and execute computer programs stored in a memory to perform the method in implementations of the disclosure.

Optionally, the chip 700 further includes the memory 720. The processor 710 can invoke and execute the computer programs stored in the memory 720 to perform the method in implementations of the disclosure which is performed by the network device or the network device.

The memory 720 may be a separate device independent of the processor 610, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of simplicity.

Optionally, the chip is applicable to the terminal device in implementations of the disclosure. The chip can implement the operations performed by the terminal device in various methods in implementations of the disclosure, which will not be repeated herein for the sake of simplicity.

The chip applied to the network device may be the same as or different from the chip applied to the terminal device.

It should be understood that the chip mentioned herein may also be referred to as a system-on-chip (SOC) or the like.

The processor mentioned above may be a general-purpose processor, a digital signal processor (DSP), a field programmable gate array (FPGA), an application specific integrated circuit (ASIC), or other programmable logic devices, discrete gates or transistor logic devices, discrete hardware components. The general purpose processor may be a microprocessor, or the processor may be any conventional processor or the like.

The memory mentioned above may be transitory memory or non-transitory memory, or may include both transitory and non-transitory memory. The non-transitory memory may be a read-only memory (ROM), a programmable ROM (PROM), an erasable PROM (EPROM), an electrically erasable PROM (EEPROM), or a flash memory. The transitory memory may be a random access memory (RAM).

It should be understood that the above memory is illustrative but not limiting. For example, the memory in implementations of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). It should be noted that, the memory described in the disclosure is intended to include, but is not limited to, these and any other suitable types of memory.

Figure 14:
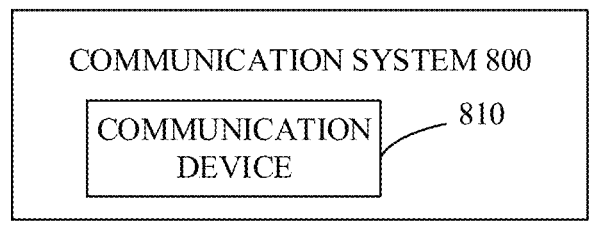
FIG. 14 is a schematic block diagram of a communication system according to an implementation of the disclosure.

FIG. 14 is a schematic structural diagram of a chip 700 according to implementations of the disclosure. The communication system 800 includes at least one communication device 810.

The communication device 810 is the communication device described above. That is, the communication device 810 can implement corresponding functions implemented by the communication device in the foregoing methods, which will not be repeated herein for the sake of simplicity.

The implementations described above may be implemented in whole or in part by software, hardware, firmware, or any combination thereof. When implemented using software, it may be implemented in whole or in part in the form of a computer program product comprising one or more computer instructions. When the computer program instruction is loaded and executed on the computer, all or part of procedures or functions according to the implementations of the disclosure are generated. The computer may be a general purpose computer, a special purpose computer, a computer network, or other programmable apparatus. The computer instructions may be stored on a computer-readable storage medium, or transmitted from one computer-readable storage medium to another. For example, the computer instructions may be transmitted from a website, computer, server, or data center to another website, computer, server, or data center in a wired (e. g., coaxial cable, fiber optics, digital subscriber line (DSL)) or wireless (e. g., infrared, wireless, microwave, etc.) manner. The computer readable storage medium may be any available medium that can be accessed by a computer, or a data storage device such as a server, a data center, or the like that integrated with one or more available media. The available medium may be a magnetic medium, (e. g., floppy disk, hard disk, magnetic tape), an optical medium (e. g., DVD), or a semiconductor medium (e. g., solid state disk (SSD)), or the like.

It should be understood that, in various implementations of the disclosure, a sequence number of each of the foregoing processes does not imply an execution order, and an execution order of each of the processes should be determined according to a function and an internal logic thereof, which should not constitute any limitation to an implementation process of the implementations of the disclosure.

It may be clearly understood by a person skilled in the art that, for the purpose of convenient and brief description, for a detailed working process of the foregoing system, apparatus, and unit, reference may be made to a corresponding process in the foregoing method implementations, and details are not described herein again.

The foregoing descriptions are merely specific implementations of the present application, but are not intended to limit the scope of protection of the present application. Any variation or replacement readily figured out by a person skilled in the art within the technical scope disclosed in the present application shall belong to the scope of protection of the present application. Therefore, the scope of protection of the present application shall be subject to the scope of protection of the claims.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A communication method, comprising:
   initiating, by a communication device, a survival time guarantee strategy at a first object of the communication device when first packet or burst transmission failure occurs, according to first information, wherein the first object comprises a user data radio bearer (DRB); and
   determining, by the communication device, an execution subject of the survival time guarantee strategy on the communication device, wherein the communication device is a terminal device, and the execution subject is an access stratum (AS) of the terminal device, and the AS comprises a media access control (MAC) layer;
   wherein initiating the survival time guarantee strategy comprises:
   executing a first behavior, wherein the first behavior comprises a guarantee behavior related to survival time, and the guarantee behavior comprises packet data convergence protocol (PDCP) duplication.

2. The communication method of claim 1, wherein the first behavior further comprises a monitoring behavior.

3. The communication method of claim 1, wherein the first object comprises an application-level transfer object, and the application-level transfer object comprises the DRB and further comprises at least one of:
   a user equipment (UE);
   a QoS flow;
   a time-sensitive networking (TSN) flow; and
   a packet data unit (PDU) session.

4. The communication method of claim 1, wherein the first information contains a first indication, and the first indication is used to configure or indicate initiating of the survival time guarantee strategy.

5. The communication method of claim 1, further comprising:
   determining, by the communication device, whether a first condition is satisfied before initiating the survival time guarantee strategy.

6. The communication method of claim 5, wherein whether the first condition is satisfied is determined by the communication device based on the first information.

7. The communication method of claim 6, wherein the first condition comprises at least one of:
   a survival time is indicated to the communication device;
   the communication device is configured with the survival time;
   the communication device is instructed to initiate the survival time guarantee strategy; and
   the communication device is configured to initiate the survival time guarantee strategy.

8. The communication method of claim 1, wherein:
   the AS further comprises at least one of: a packet data convergence protocol (PTCP) layer, and a radio link control (RLC) layer; and
   the higher layer of the terminal device comprises at least one of: a device-side transmission sequence number (TSN) translator (DS-TT) layer, a non-access stratum (NAS), and an application layer.

9. A communication device, comprising:
   a processor; and
   a memory storing computer programs which, when executed by the processor, are operable with the processor to:
   initiate a survival time guarantee strategy at a first object of the communication device when first packet or burst transmission failure occurs, according to first information;
   determine an execution subject of the survival time guarantee strategy on the communication device, wherein the communication device is a terminal device, and the execution subject is an access stratum (AS) of the terminal device, and the AS comprises a media access control (MAC) layer;
   wherein the processor configured to initiate the survival time guarantee strategy is configured to: execute a first behavior, wherein the first behavior comprises a guarantee behavior related to survival time, and the guarantee behavior comprises packet data convergence protocol (PDCP) duplication.

10. The communication device of claim 9, wherein the first behavior comprises a monitoring behavior.

11. The communication device of claim 9, wherein the first object comprises an application-level transfer object, and the application-level transfer object comprises the DRB and further comprises at least one of:
   a user equipment (UE);
   a QoS flow;
   a time-sensitive networking (TSN) flow; and
   a packet data unit (PDU) session.

12. The communication device of claim 9, wherein the first information contains a first indication, and the first indication is used to configure or indicate initiating of the survival time guarantee strategy.

13. The communication device of claim 9, wherein the processor is further configured to:
   determine whether a first condition is satisfied before initiating the survival time guarantee strategy.

14. The communication device of claim 13, wherein whether the first condition is satisfied is determined by the communication device based on the first information.

15. The communication device of claim 14, wherein the first condition comprises at least one of:
   a survival time is indicated to the communication device;
   the communication device is configured with the survival time;
   the communication device is instructed to initiate the survival time guarantee strategy; and
   the communication device is configured to initiate the survival time guarantee strategy.

16. A non-transitory computer readable storage medium, configured to store computer programs which, when executed by a device, cause the device to:
   initiate a survival time guarantee strategy at a first object of the device when first packet or burst transmission failure occurs, according to first information;
   determine an execution subject of the survival time guarantee strategy on the device, wherein the device is a terminal device, and the execution subject is an access stratum (AS) of the terminal device, and the AS comprises a media access control (MAC) layer;
   wherein initiating the survival time guarantee strategy comprises executing a first behavior, wherein the first behavior comprises a guarantee behavior related to survival time, and the guarantee behavior comprises packet data convergence protocol (PDCP) duplication.

17. The non-transitory computer readable storage medium of claim 16, wherein the first information contains a first indication, and the first indication is used to configure or indicate initiating of the survival time guarantee strategy.

* * * * *